United States Patent
Jackson et al.

(10) Patent No.: US 6,853,098 B1
(45) Date of Patent: Feb. 8, 2005

(54) COMMUNICATIONS INTERFACE AND FLOATING DEVICES INCLUDING SUCH AN INTERFACE

(75) Inventors: Jane Patricia Jackson, Edinburgh (GB); Roger Charles Peppiette, Edinburgh (GB); Colin Ramsay, Edinburgh (GB)

(73) Assignee: Analog Devices, Inc., Norwood, MA (US)

( * ) Notice: Subject to any disclaimer, the term of this patent is extended or adjusted under 35 U.S.C. 154(b) by 50 days.

(21) Appl. No.: 10/354,806

(22) Filed: Jan. 30, 2003

Related U.S. Application Data

(63) Continuation of application No. 10/242,978, filed on Sep. 13, 2002.

(51) Int. Cl.[7] .................................................. H02J 1/00
(52) U.S. Cl. .............................. 307/85; 307/43; 307/44; 307/80; 307/127; 307/140
(58) Field of Search ............................... 307/43, 44, 80, 307/85, 127, 140, 64

(56) References Cited

U.S. PATENT DOCUMENTS

| | | | | |
|---|---|---|---|---|
| 4,398,105 A | * | 8/1983 | Keller | 327/19 |
| 2001/0026484 A1 | * | 10/2001 | Noma et al. | 365/200 |

* cited by examiner

*Primary Examiner*—Robert DeBeradinis
(74) *Attorney, Agent, or Firm*—Wolf, Greenfield & Sacks, P.C.

(57) ABSTRACT

A communication device is provided which transmits and responds to differential currents. Thereby allowing communication between devices that may be floating with respect to each other.

15 Claims, 6 Drawing Sheets

| Valid | | |A|>|B| | Mout | Comm | | State | | Row# |
|---|---|---|---|---|---|---|---|---|
| M | S | | | M→S | S→M | M | S | |
| 0 | 0 | 0 | 0 | - | - | 0 | 0 | 1 |
| 0 | 0 | 1 | 0 | - | - | 0 | 0 | 2 |
| 0 | 1 | 0 | 0 | y | - | 0 | 1 | 3 |
| 0 | 1 | 1 | 0 | y | - | 0 | 1 | 4 |
| 1 | 0 | 0 | 0 | - | y | 1 | 0 | 5 |
| 1 | 0 | 1 | 1 | - | - | 1 | 0 | 6 |
| 1 | 1 | 0 | 0 | - | y | 0 | 1 | 7 |
| 1 | 1 | 1 | 1 | y | - | 1 | 0 | 8 |

Fig. 3

| IC info | | Comms |
|---|---|---|
| Mout | Svalid | |
| 0 | 0 | y |
| 0 | 1 | y |
| 1 | 0 | - |
| 1 | 1 | y |

Fig. 4

|  | Example 1 | Example 2 | Example 3 | Example 4 |
|---|---|---|---|---|
| $\Delta V_{IC}(IC1:IC2)$ | 0 | 0 | 0 | large |
| $\Delta V_{SIGNAL}(IC1)$ | 0 | 0 | V | 0 |
| $\Delta V_{SIGNAL}(IC2)$ | 0 | V | 0 | 0 |

Fig. 6

| Mout | Svalid | $\Delta V_{SIGNAL}$ (IC1) | $\Delta V_{SIGNAL}$ (IC2) | Iout (IC1) | Iout (IC2) |
|---|---|---|---|---|---|
| 0 | 0 | 0 | 0 | 0 | 0 |
| 0 | 1 | 0 | V | -i | +i |
| 1 | 0 | V | 0 | +i | -i |
| 1 | 1 | V | V | 0 | 0 |

Fig. 7

COMMUNICATIONS INTERFACE AND FLOATING DEVICES INCLUDING SUCH AN INTERFACE

CROSS-REFERENCE TO RELATED APPLICATION

This application is a continuation of U.S. patent application Ser. No. 10/242,978, entitled MULTI-CHANNEL POWER SUPPLY SELECTOR, filed Sep. 13, 2002, which is still pending.

BACKGROUND

The present invention relates to a communications interface which is suited for use in devices which, in electrical terms, can float with respect to one another. The interface is particularly suited for use in exchanging data between floating devices such as power controllers for hot swappable high availability systems.

There are a number of instances where devices need to reliably communicate information with each other. If the devices have common supply rails then this is a fairly trivial task. However, there are circuit configurations where the devices are not tied with respect to a common reference voltage and this complicates the issue of decoding signal levels.

FIG. 1 schematically illustrates the circuit configuration of a high availability power supply offering dual channel redundancy per the above-noted application Ser. No. 10/242, 978. Nodes A and B represent connections to first and second power supplies. Each power supply has a nominal output voltage of –60 volts for European use and –48 volts for use in the USA, but the output voltage may rise as high as zero volts in the event that the power supply fails completely and may drop as low as –100 volts. Each selection and hot swap control is tasked with ensuring that the most appropriate power supply is connected to the load at any given time. In general, this means that the power supply with the most negative output voltage (that is largest magnitude of output voltage) is connected to the load provided that the output voltage of the power supply falls within an acceptable range of voltages defined by a window comparator within the selection and hot swap controls.

It is possible to fabricate the selection and hot swap controllers 2 and 4 such that they can withstand in excess of 100 volts across their power supplies. However in the case of telecommunications equipment, some redundancy has to be added to take account of environmental fluctuations which may, for example, be caused by lightening strikes or voltage transients that may occur when a hot swappable card is removed (resulting from the sudden collapse of magnetic fields around components exhibiting inductance) and hence the fabrication process should be such that it can withstand several hundreds of volts if this route is taken.

By contrast, it is also possible to configure the selection and hot swap controllers 2 and 4 within the circuit such that they only see relatively small voltages across their power supplies and consequently low voltage fabrication techniques can be used giving rise to smaller device footprints and reduced dissipation within the device. If we consider channel A of FIG. 1, it can be seen that first and second MOSFETs 6 and 8 are connected in series between the node A and the load. The MOSFETs are connected back to back such that the source of the MOSFET 6 is connected to the source of the MOSFET 8, with the drain of the MOSFET 6 being connected to power supply A and the drain of the second MOSFET 8 being connected to the load. The selection and hot swap controller 2 has a first power supply connection 10 connected to ground 12 via a resistor 14. A second power supply connection 16, VEE, is connected to a node 18 formed between the source of the first MOSFET 6 and the source of the second MOSFET 8.

Each of the MOSFETs 6 and 8 includes an internal source-drain diode 20 and 22 respectively. This diode is entirely parasitic and occurs as a consequence of the internal construction of the MOSFET. The existence of this diode is used in order to ensure that the selection and hot swap controller 2 receives a suitably negative voltage at its power supply line 16 in order to ensure that it has access to a sufficiently negative voltage to ensure that it can switch the transistor parts of the MOSFETs into non-conducting states, although of course no active control can be exerted over the parasitic diode which can be considered as a separate component within the package. Thus, if supply A was at –50 volts and supply B was at –60 volts then the MOSFETs 6' and 8' would be controlled by the selection and hot swap controller 4 to be conducting such that power supply B was connected to the load. Simultaneously, the MOSFETs 6 and 8 under the control of the connection and hot swap controller 2 would be switched off in order to deselect a power supply A. Thus the power supply line 16' of the controller 4 would be at –60 volts. As a consequence of this the voltage of node 18 in channel A would drop to –60 volts less the voltage dropped across the forward biased parasitic diode 22, so controller 2 is able to control MOSFET 8 to be off. Supply B remains the selected supply in spite of the similar voltages at nodes 18 and 18' due to hysteresis in the supply selection. If the power supply B were to fail, rising to zero volts, then MOSFETs 6 and 8 under the control of controller 2 would be switched on, and MOSFET 6' and 8' under the control of the controller 4 would be switched off. Under this condition the voltage at the supply 16 of the first controller would remain at around –50 volts and the voltage at the supply 16' of the second controller 4 will also rise to approximately –50 volts as a result of conduction through the parasitic diode 22' of the MOSFET 8'. Thus even in the event of failure of an associated power supply, each controller sees a sufficient voltage between its power rails in order to allow it to operate.

It has been assumed up until now that the MOSFETs 8 and 8' are fully on or fully off. This however need not always be the case as these devices may be used to limit the current flowing to the output. Current limiting will typically occur upon insertion of a board in order to limit the inrush current to the board, but may also occur under fault conditions. The current limiting can cause a significant voltage to be dropped across the MOSFET 8 or 8' and hence the selection and hot swap controllers 2 and 4 may float to radically dissimilar voltages with respect to one another. Large voltage differences between the controllers 2 and 4 can also occur if one supply is over-voltage and one is under-voltage. For example if supply A is at –30V, supply B is at –80V and the acceptable operating window of the load is –35 to –75V, then neither supply is enabled and consequently the load is at ground voltage. This means that the VEE of controller 2 is –30V and the VEE of controller 4 is –80V, thereby giving rise to a voltage difference of 50 volts. However it is clear that the selection and hot swap controllers 2 and 4 must continue to communicate with each other in order that they can agree which supply is to be, selected to supply power to the load.

According to a first aspect of the present invention there is provided an apparatus for communicating data, the apparatus comprising:

first and second inputs for receiving first and second input signals, first and second communications terminals for performing communication with a co-operating communication apparatus, and an output terminal, wherein the first and second communications terminals simultaneously output first and second signals representative of the first and second input signals and receive signals from the first and second communications terminals of the co-operating communications apparatus, and wherein the output terminal outputs a signal as a function of the difference between the first signal received from the co-operating communications apparatus and the second signal received from the co-operating communications apparatus.

It is thus possible to provide a communications apparatus where data is communicated on the basis of the relative values of the first and second signals received from a co-operating communications device, rather than on the basis of the absolute value of any single given signal.

Preferably the communications apparatus is responsive to a current flow from the co-operating communications apparatus. Thus both devices can simultaneously send and receive data as the total current flowing between the devices can be regarded as the superposition of the individual currents resulting from each device.

Preferably the output terminal of a controller is a function of the current received from the co-operating communications apparatus and also the current being driven from the controller itself. In order to resolve any ambiguities resulting from the combination of currents from the two controllers, each controller can use knowledge of its own operating state to deduce the state of the other controller.

Preferably the devices are interconnected via resistors which serve to define the maximum current that can flow for a given operating voltage range.

According to a second aspect of the present invention, there is provided a system comprising first and second devices, each including an apparatus for communicating data according to the first aspect of the present invention, and in which each device uses knowledge of its own operating state in order to resolve the information conveyed by the signal at the communications terminals, where that information is ambiguous.

Preferably the devices are power supply selection and hot swap controllers.

Advantageously the power supply selection and hot swap controllers include a first output for controlling a first transistor for power supply selection and a second transistor operable to further select a supply and/or limit current flow to a device supplied by the power supply.

Preferably each power supply selection and hot swap controller includes a window comparator for monitoring the associated power supply so as to only allow it to be selected if the supply voltage is within an acceptable range.

Preferably each power supply selection and hot swap controller includes an internal voltage regulator for deriving its own supply from either a direct or indirect connection to one or both supplies that are being monitored.

Preferably at least one of the power supply and selection hot swap controllers includes a comparator for monitoring a plurality of supplies to the load, and for determining which one is to be connected. It will be appreciated that only one comparator should undertake this task at any one time.

In an embodiment of the present invention a very simple coding scheme is used in which the first and second communications terminals of the co-operating device are examined to see if they are either in different operating states (ie different output voltage) or at the same state. Such a code is very robust where the absolute voltages of the communications devices can vary wildly with respect to ground. However such a scheme may not be able to fully encode all the operating states of a system comprised of two co-operating devices. However, the valid operating states of the system and the coding scheme can be selected such that any ambiguity in the coding can be resolved by reference to the operating state of a device seeking to resolve the ambiguity and the valid operating states of the system.

The present invention will further be described, by way of example only, with reference to the accompanying drawings, in which:

FIG. 1 schematically illustrates a circuit arrangement having two control devices which may float with respect to one another and which need to exchange data with one another;

FIG. 2 illustrates the selection and hot swap controllers in greater detail;

FIG. 3 schematically illustrates a truth table showing the states that either controller may assume and its resulting output;

FIG. 4 schematically shows a simplified view of the part of the truth table of FIG. 3;

FIG. 5 schematically illustrates the circuit arrangement for a first part of the communications apparatus;

FIG. 6 is a truth table illustrating some of the voltage differences that are communicated in the circuit of FIGS. 1 and 2;

FIG. 7 is a truth table showing the current at the output terminal of the communications circuitry, (node 124 in FIG. 5), on each device for the system states that need to be communicated between the devices.

Figure 1:
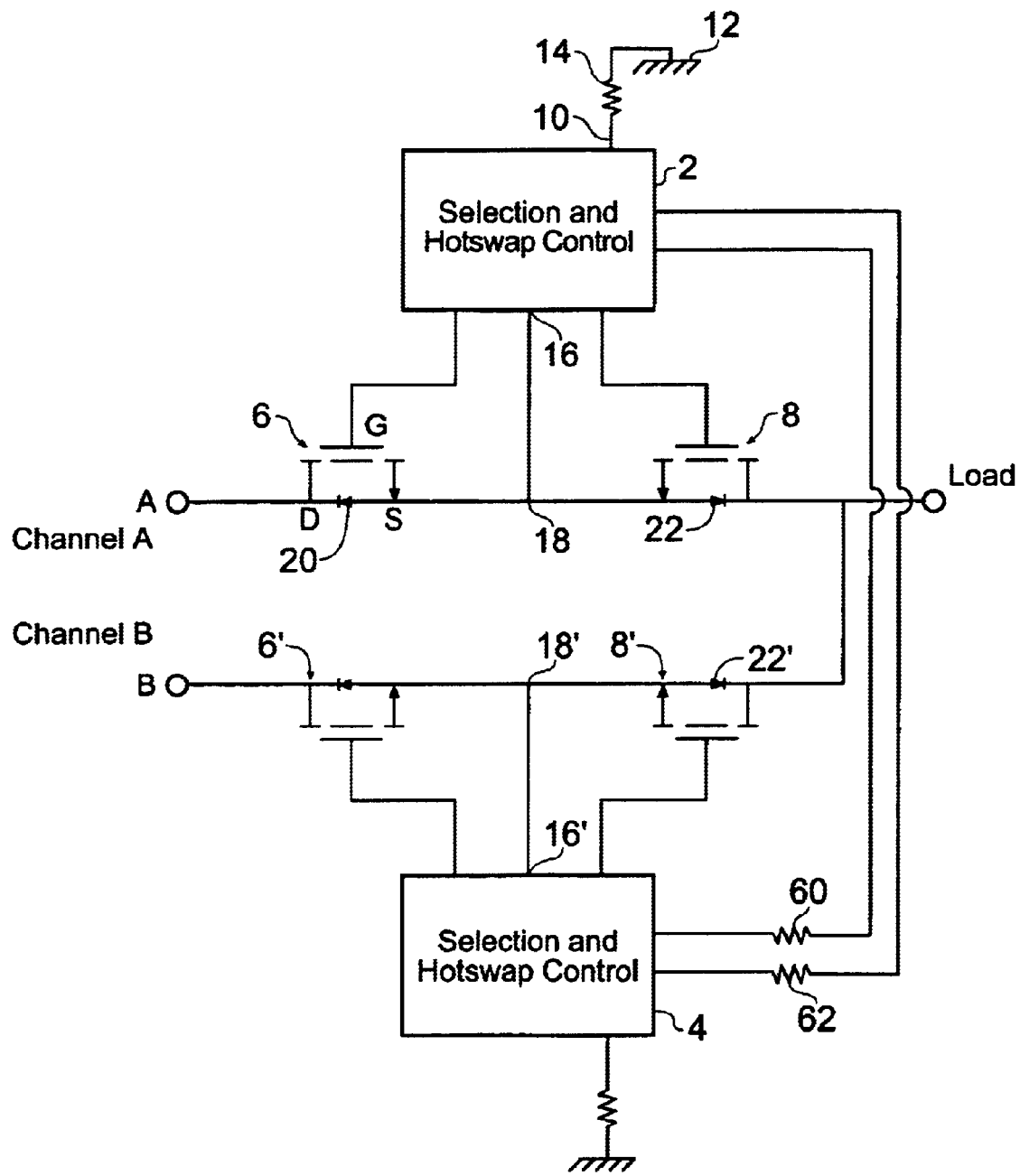
Figure 2:
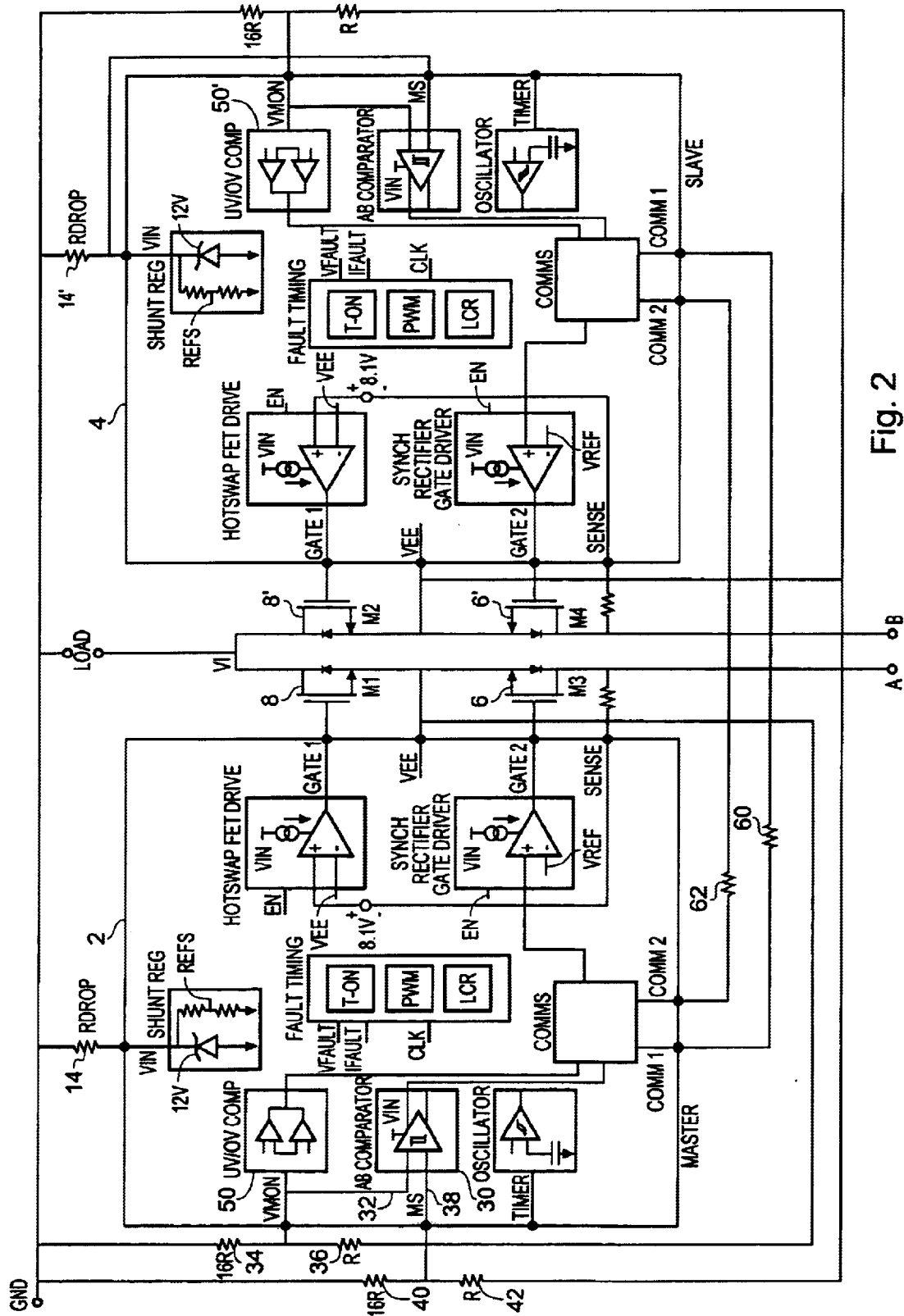

FIG. 2 schematically illustrates the arrangement of FIG. 1 in more detail. Each controller 2 and 4 is identical, and hence only the first controller 2 needs to be described in detail. The first controller includes a comparator 30 which has a first input 32 which receives an indication of the voltage at the node formed between MOSFETs 6 and 8 via a potential divider formed by resistors 34 and 36. A second input 38 receives a measurement of the voltage formed at the node between the MOSFETs 6' and 8' via a potential divider formed by resistors 40 and 42. Thus the controller 2 is able to determine which supply, A or B is most negative. Measuring the voltage at the nodes between the pairs of series connected transistors 6 and 8 and 6' and 8' rather than at the supplies A and B works because for the most negative supply the parasitic source drain diode of the associated transistor 6 or 6' will become conducting. The potential dividers formed by the resistors 34 and 36, and 40 and 42 ensure that the voltage seen at the comparator inputs is representative of the voltage from the supplies A and B whilst simultaneously being bounded by the on-chip supply voltage. In the embodiment shown in FIG. 2, the resistors 34 and 40 connected between the inputs of the comparator 32 and 38 and ground are 16 times larger than the resistors 36 and 42 which connect to the nodes formed between the transistors 6 and 8 and 6' and 8', respectively. In use, only one of the controllers 2 and 4 is configured to sense the voltages of the supplies in this way, and this single controller, in this case controller 2, becomes the "master" of the controller pair. The controller 4 is configured as a slave with one of the inputs of its comparator being tied to one of the supply pins, this condition being detected by internal circuitry to signal to the controller 4 that the controller 4 is configured as a slave.

The controller 2 also includes a comparator 50 which receives a measurement of the voltage occurring at the node between its associated transistors 6 and 8, and which generates a signal indicative of whether the voltage from the associated supply A is within an acceptable range. In fact due to the action of the parasitic diodes 22 and 22' an under voltage fault occurring in only one of the power supplies will be masked. In the example given above where A is −50V and B is −60V the voltage at node 18 would also be about −60V. It follows that under these conditions if supply A were to fault to, say, −20V then this under voltage condition would be masked. However it does not matter as the masking only occurs on the unselected power supply and this supply (supply A) was not going to be selected anyway The controller can determine the magnitude of the voltage at its VEE pin as it has an internal voltage reference, and implicit knowledge of the ratio of the resistors 34 and 36 in the potential divider.

The slave controller 4 also has a comparator 50' which checks that the voltage occurring at the node between transistor 6' and 8' is within a correct operating range.

Thus the master device 2 determines on the basis of the comparator 32 whether it should connect its supply A to the load, or whether it should instruct the slave device 4 to connect the supply B to the load. Furthermore, each device 2 and 4 can determine whether the voltage at the node between its associated field effect transistors 6 and 8 or 6' and 8', respectively, is valid (i.e., within an acceptable voltage range as defined by the comparator).

However it is clear that the master controller 2 needs to indicate to the slave controller 4 which one of the supplies A and B is to be supplied to the load, and furthermore the master controller must have knowledge of whether the monitored voltage seen by the slave controller is valid.

FIG. 3 schematically illustrates the operating states of the system shown in FIG. 2. The table includes a plurality of columns. The column "valid M" has a 1 therein if the, supply voltage as monitored at the junction between the field effect transistors 6 and 8 is valid, that is within the acceptable operating range, and zero if it is invalid. This information is known only to the master. Thus in this example the master is valid only in rows 5 to 8 of the table shown in FIG. 3. Similarly, the column "valid S" has a 1 therein only if supply B, as monitored between the FETs 6' and 8' by the slave, is valid and has a zero therein if it is invalid. This information is known only to the slave. The third column compares the magnitudes of the voltages A and B and is a 1 if the magnitude of supply A as monitored at the node between the FETs is greater than the magnitude of supply B.

The fourth column "Mout" is a combined state indicating the state that the master expects to be in prior to receiving any information from the slave. This column is the combination of the valid M column logically AND end with the third column |A|>|B|.

The fifth and sixth columns COMM M→S and S→M indicate those states where 5 information is required by the slave from the master or by the master from the slave, respectively, in order to resolve its own state. A "y" indicates that knowledge is required from the other controller in order to reach an unambiguous decision concerning operating state. The final two columns state M and state S indicate which of the master and the slave is selected. Thus, in the state M column the master selects supply A in rows 5, 6 and 8 and instructs the slave to select supply B in rows 3, 4, and 7.

Now, from this table, we can consider just the combined master state Mout and the slave validity state (column 2), ie the information that each device has without any reference to the other. This information is presented in FIG. 4 along with a column combining the information in the table in FIG. 3 regarding the requirement to communicate data between the devices. It can be seen that the table shown in FIG. 4 is comprised of rows 4, 5, 6 and 8 of the table shown in FIG. 3.

It can therefore be seen that we need to be able to communicate between the two controllers for three out of four of the possible combinations of Mout and Svalid. It is easy to see the situations in which the slave requires information from the master. When<the associated slave voltage B is invalid, the slave can make its own decision without any input from the master as it must turn off its associated supply. When the slave is valid, it requires information from the master to let it know whether or not to turn on (see FIG. 3 rows 3, 4, 7 and 8). The master only requires information from the slave when the master supply. (monitored voltage) is valid and the result of the comparison of that the master performs on the supplies shows that the slave supply has a greater magnitude. In this case, the master does not know whether the slave's associated supply is valid. The slave supply may, for example, be outside the voltage window. Therefore communication is required from the slave to the master as indicated in FIG. 3 rows 5 and 7, so that the master can select its own associated supply, A, if supply B is invalid.

Figure 4:
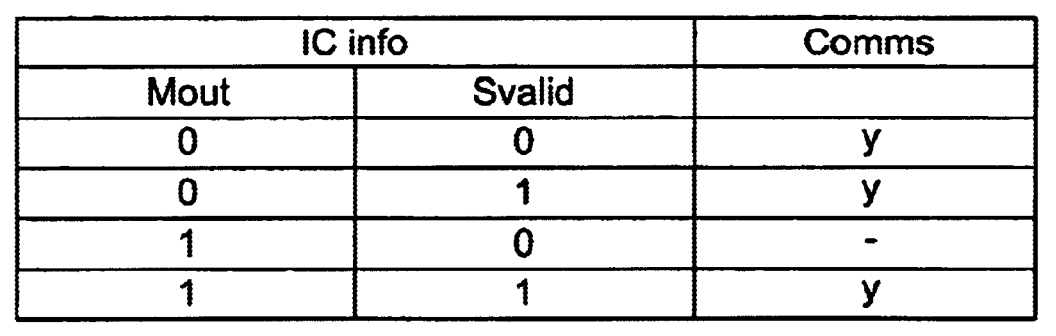

It can be seen from FIG. 4 that there exist situations in which a valid system state can only be reached with communications between the controllers. Furthermore, this communication can be carried out using only one bit of information from each controller combining to a two bit information system. Two bits of information lead to four specific states of which we only require 3, as set out in FIG. 4.

Since the two controllers may float with respect to one another, it becomes necessary to use a scheme where voltage differences or current flows resulting from the fact that the controllers can float with respect to one another do not interfere with the communications scheme. A suitable scheme is a differential current scheme. In this arrangement the controllers have their communications ports connected via external resistors which serve to limit the maximum current flow into or out of each controller.

Consider the arrangement shown in FIG. 2 in which the controllers 2 and 4 have assumed a condition, for example because of a power supply failure, in which the controller 2 is sitting at a voltage 50 volts higher than that of the controller 4. Thus we have a current flow flowing out of both communications ports of the controller 2 and into the communications ports of the controller 4. The current flow is determined by the size of the resistors 60 and 62 which are preferably substantially equal. If the communications ports of is the-controller 2 are both driven to the same voltage internally, and those of controller 4 are also driven to the same voltage internally, then the current flows via resistors 60 and 62 should be substantially identical. If one of the communications ports on the controller 2 differs from the other by a voltage $V_{signal}$, whilst those of controller 4 remain at the same voltage as each other, then the current flowing in the resistors 60 and 62 will also differ and this difference can be resolved by the controller 4. Thus, the common mode current flowing in each of the resistors 60 and 62 is determined by the voltage difference between the controllers 2 and 4 and the difference between the currents flowing in the resistors 60 and 62 is determined by a signal driving voltage existing between the communications pins of the controllers themselves.

Since only three states need to be represented in the communications scheme, it is sufficient that on each controller the output $V_{signal}$ can take one of two values representing a binary zero or a binary 1. Although the absolute values forced onto the communications pins will be determined by the circuit design and power supply values, the value of the signal can still be determined. The value $V_{signal}$ to be encoded is that of Mout in the case of the master device and that of Svalid in the case of the slave device. For simplicity $V_{signal}$ is defined between the communications pins COMM1 and COMM2, and a positive $V_{signal}$ means that COMM2 is at a greater voltage than COMM1.

Figure 5:
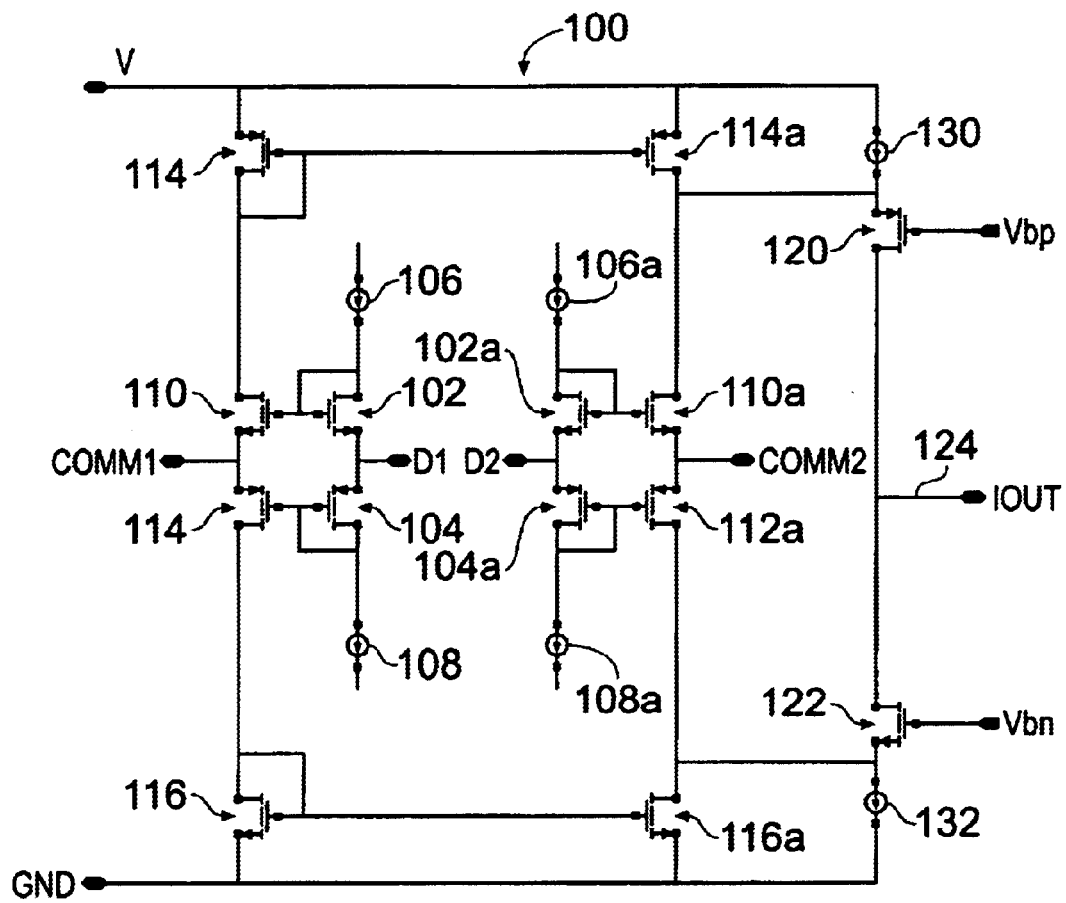

In addition to being able to force a voltage between the pins COMM1 and COMM2 the communications circuitry on each controller must also simultaneously detect the current differential between the communications pins resulting from the action of the other controller. A circuit capable of fulfilling this requirement is shown in FIG. 5. This circuit sees the sum of the currents from the controllers 2 and 4 and hence its output is a function of the signals being driven by both controllers. The circuit is identical in each of the controllers 2 and 4 and has ports D1, D2, COMM1 and COMM2. The voltage differential signal $V_{signal}$ is determined by the state of either Mout or Svalid on the master and slave controllers, respectively, and is driven between the pins D1 and D2.

FIG. 6 is a truth table setting out the voltage differentials occurring between the communications ports COMM1 and COMM2 of the master and slave devices, respectively, for each of the examples, that will be considered later. The truth table of FIG. 6 relates to the operation of the circuit shown in FIG. 5.

The circuit shown in FIG. 5 represents one configuration of the communications apparatus in accordance with the present invention.

The communications controller, generally indicated 100, receives first and second inputs D1 and D2 from voltage sources (not shown) that serve to define the magnitude of the voltage difference signal Vsignal that the output is to encode. If D1=D2 then Vsignal is zero, whereas if D2>D1 then in logical terms Vsignal=1. As noted before, the master controller encodes the state of Mout (ie Mvalid AND |A|>|B|) and the slave controller encodes the state of Svalid. Thus each device has internal logic that ensures that it is encoding the correct signal.

First and second series connected FETs 102 and 104 are arranged such that their sources are connected to the node representing the input D1. The gate of the FET 102 is connected to the drain of the FET 102. Similarly the gate of the FET 104 is connected the drain of the FET 104. The series connected FETs receive current from and sink current to current sources 106 and 108 respectively. The gate of the first FET 102 is also connected to the gate of a third FET 110 whose source is connected to the communications pin COMM1. The gate of the second FET 104 is also connected to the gate of a fourth FET 112 whose source is also connected to COMM1. The third FET 110 is in series with a fifth FET 114 whose source is connected to a positive supply line V, whose drain is connected to the drain of the third FET 110 and which has its gate connected to its drain. The fourth FET 112 is in series with a sixth FET 116 whose source is connected to the internal negative supply, whose drain is connected to the drain of the fourth FET 112 and which also has its drain connected to its gate. A identical circuit configuration surrounds D2 and COMM2 and like components are designated with the same reference numeral followed by the letter "a". The gate of the FET 114a is connected to the gate of the FET 114, but there is no connection between the gate and the drain of the FET 114a. Similarly the gate of the FET 116a is connected to gate of the FET 116 but there is no connection between the gate and the drain of the FET 116a. First and second output FETs are arranged in series with their respective drains connected to an output terminal 124. The first output FET 120 has its source connected to a current source 130 and also to the drain of the FET 114a. The second output FET 122 has its source connected to a current sink 132 and also to the drain of FET 116a. The current source 130 and current sink 132 are matched so that the source and sink are at the same current. Similarly current source 106 and current sink 108 are matched, and current source 106a and current sink 108a are matched. Transistor pairs 102 and 110 form a current mirror, as do pairs 104 and 112, 102a and 110a, 112a and 104a, 114 and 114a, and 116 and 116a.

In operation, the voltage which is placed on D1 is reflected onto COMM1 by virtue of the fact that the gate to source voltage drop Vgs of FET 102 is matched by that of FET 110 as is the Vgs of FETs 104 and 112. Similarly, the voltage placed on input D2 is transferred to communications port COMM2. As shown in FIG. 2, the communications ports COMM1 and COMM2 of the first controller 2 are connected to the communications ports COMM1 and COMM2 of the second controller 4 via linking resistors 60 and 62. However not only must the COMM ports transmit data to the other controller, but they must receive data from it and, because of the need to have a rapid response in the power supply system, this transfer must be done as fast as possible which is best achieved by use of an asynchronous communications system.

Returning to FIG. 4, it can be seen that each of the states which are necessary to define the operation of the system can be encoded by one bit from each controller. Thus each controller needs able to only output one bit of information, namely a logical 1 when D1 and D2 are different and a logical zero when D1 and D2 are the same and similarly it needs to be able only to decode one bit of information received from the corresponding controller. The operation of the controller can be further understood with reference to four examples of the type illustrated in FIG. 6. In each case, it can be assumed that the circuit under discussion is that on the first controller 2.

In the first example, the voltage difference between the first and second controllers 2 and 4 is zero, i.e., they have floated to the same voltage, and the output signal $V_{signal}$, i.e., the difference between the communications lines, is zero on both the first and second controllers. In this condition no current flows into or out of the communications ports since there is no voltage differential across the external resistors. This state is converted to a single current output from the circuit shown in FIG. 5. The current flowing through the FET 114 and the FET 116 is determined by the current flowing in the FETs 106 and 108 respectively. Since the current in FET in current 106 matches that in 106a and the current in FET 108 matches that in 108a then the current demanded from FET 114a is identical to that demanded in FETs 114 and 116. As a consequence, no current enters or leaves the output current path via the sources of the FETs 120 or 122. The current source 130 matches the current source 132 so IOUT is zero.

In the second example, the controllers are again at the same supply voltage, but now the signal voltage $V_{signal}$ on the first controller is zero whilst the signal voltage $V_{signal}$ on the second controller is +V. Under these conditions no current flows in COMM1. However a current, I, created by $V_{signal}$ across the external resistor 62 flows into COMM2 of the first controller. The current flowing in FET 114 is controlled by the bias current source 106. The current demanded from the FET 114a is equal to that in FET 114 by virtue of the circuit configuration. The current flowing through FET 116 is controlled by the bias current sink 108. Since FETs 116 and 116a form a current mirror, FET 116 controls FET 116a to sink the same bias current. However extra current is entering port COMM2 and since current flow through FET 116a is limited this current must be sunk by current source 132. Since the current sources and sinks 130 and 132 are matched, not all of the current provided, by the source 130 can now be sunk by the current sink 132 and consequently current flows out of the output pin IOUT.

In the third example the signal difference on the first controller is +V, on the second controller the signal difference $V_{signal}$ is zero and again the controllers are at the same absolute voltage. Under these conditions no current will flow out of COMM1. However there is a net current flow out of COMM2. The FET 114a can only supply the bias current equivalent to that flowing in FET 114 which is itself mirrored from a current source 106. Therefore the current out of COMM2 has to come from the current source 130. Since the current source 130 is matched to the current sink 132 the current sink 132 tries to sink more current than the source 130 can provide. Therefore current must flow into the output pin IOUT.

The fourth example is similar to the first example in that both devices are trying to drive a signal $V_{signal}$ of zero volts. However there is now a large potential difference between the first and second controllers with the voltage of the first controller being greater than that of the voltage of the second controller. Therefore a large current flows out of both COMM1 and COMM2 ports of the first controller. These currents will be equal. Furthermore, because these currents are large compared to the internal bias currents the $V_{gs}$ of the FETs 110 and 110a is much larger than that of the FETs 102 and 102a This leads to the FETs 112 and 112a being off since their $V_{gs}$ is forced to be small. However the current in FET 114 which is equal to the current out of COMM1 will control a current in FET 114a which is equal to the current out of COMM2. Therefore there is no differential current to find its way into the output current line via the source of FETs 120 or 122 so IOUT remains zero. Thus regardless of the voltage differential between the two integrated circuits, the current out of the communications circuit depends only on the signal voltage driven by each integrated circuit, and common mode current flow is cancelled.

From the above examples, and in particular the first three, it can be seen that FIG. 7 illustrates the value of IOUT at node 124 in the communications circuitry shown in FIG. 5 on IC1 and IC2 for the four combinations Of $V_{signal}$ on IC1 and IC2. Also included, for ease of reference, are the values of Mout and Svalid. Current flow from a port is defined as being negative and flow into a port is positive.

The master can now use the information that it receives from the communication circuit in association with the value of Mout to determine whether or not to control its supply A to be on or off. Similarly, the slave can now use Svalid along with the signal that it obtains from the COMM circuitry to determine whether its associated supply should be on or off.

Figure 8:
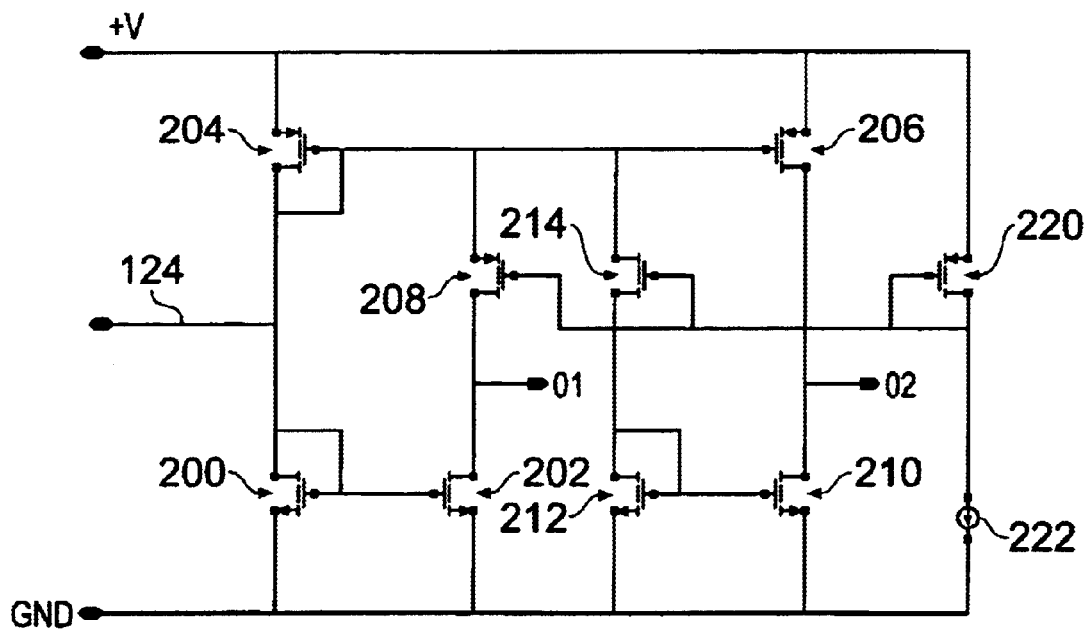
FIG. 8 is a circuit diagram of a circuit for converting the current flow signals at the output terminal of the communications circuitry back to voltage levels for driving logic circuitry.

Having produced the current flows in IOUT, it becomes necessary to convert these back into logic signals for use within the controllers. FIG. 8 schematically illustrates a circuit for performing such a task.

The current at output 124 may be positive, negative or zero, so two bits of data are required to encode it. The arrangement shown in FIG. 8 is a circuit which converts the current flowing at the output 124 into first and second voltage signals representing the magnitude and direction of the current flowing at the output 124. The output 124 is connected to the drain of transistor 200 and to the drain of transistor 204. The source of transistor 200 is connected to the internal ground supply, and the source of transistor 204 is connected to an internal positive supply within the controller 2. The gate of transistor 200 is connected to the drain of transistor 200 and similarly the gate of transistor 204 is connected to the drain of the transistor 204. Transistor 200 forms a current mirror pair with transistor 202. Similarly transistor 204 forms a current mirror pair with transistor 206. Transistor 202 has its source connected to the internal ground and its drain connected to a first output node O1 and to the drain of a further transistor 208. A source of transistor 208 is connected to the positive supply.

A drain of the transistor 206 is connected to an output node O2 and also to the drain of a further transistor 210 whose source is connected to the internal ground rail. The gate of transistor 210 is connected to the gate of transistor 212 whose gate is connected to its drain. Thus transistors 210 and 212 form a current mirror pair. The source of transistor 212 is connected to ground. The drain of transistor 212 is connected to the drain of a further transistor 214 whose source is connected to the internal supply rail +V and whose gate is connected to the gate of transistor 208 and also to the gate of a further transistor 220 which is arranged in series with a current source 222. The gate of FET 220 is connected to its drain so as to form one part of the current mirror with transistors 208 and 214.

The basis of the circuit is the current fed into or out of the node 124 is compared to a bias current generated by the current sink 222. The bias current is chosen to be half the value of the expected signal current. The current into node 124 which is generated in the circuit shown in FIG. 5 can be either positive, that is into the circuit shown in FIG. 8, or negative, that is out of the circuit shown in FIG. 8, or zero. In each case this current is compared to the output current generated by the current sink 222 and the unique combination of signals on the outputs O1 and O2 produced. When current flows into the circuit via node 124, it is sunk by the transistor 200. Current sunk by the FET 200 is mirrored by the FET 202. The current flowing through FET 208 is mirrored from the transistor 220 and hence equals that in the current source 222. Thus the transistor 202 tries to pass more current than is flowing through transistor 208 and hence the voltage at output O1 tends towards zero volts. Similarly, little current flows in the FET 204 so the bias current which the transistor 210 seeks to pass is greater than the current which the transistor 206 seeks to pass (because it is mirrored from FET 204) and hence the output O2 also tends towards zero volts. Thus current in is represented by the word "zero zero".

When current flows out of node 124 the current in transistor 204 is larger than the bias current so the current in 206 is greater than that flowing in transistor 210 and pulls the output O2 high. Little current flows through the FET 200 and this is mirrored to FET 202, so FET 208 pulls the output O1 high. Thus current out is represented by the word "one one". When there is no signal current the circuit is arranged such that O1 pulls high and O2 pulls low. Thus the no current flow condition is represented by the word "one zero".

The use of asynchronous communication means that there is no time delay during clock cycles between one device being updated as the state of the other. This stops potentially damaging cyclic switching occurring between the devices.

As noted hereinbefore each controller further includes means for controlling the inrush current to a board such that following the hot swapping of a device supplied by the controllers, the initial flow of current to that device during the phase when its capacitors are charging is maintained within safe limits. This feature is known in the prior art and need not be described further here.

It is thus possible to provide a robust communications interface which allows asynchronous communication to be performed between two devices which may float in voltage with respect to one another.

What is claimed is:

1. An apparatus for communicating data, the apparatus comprising:
    first and second inputs for receiving first and second input signals,
    first and second communications terminals for performing communication with a co-operating communications apparatus, and
    an output terminal
    wherein
        the first and second communications terminals simultaneously output first and second signals representative of the first and second input signals; and receive signals from first and second communications terminals of the co-operating communications apparatus, and wherein the output outputs a signal as a function of the difference between the first signal received from the co-operating communications apparatus and the second signal received from the co-operating communications apparatus.

2. An apparatus as claimed in claim 1, in which the first and second input signals can each assume a first range of values or a second range of values, representing digital data 0 and 1 respectively.

3. An apparatus as claimed in claim 2, in which the output assumes a non-zero condition when the first and second terminals of the communications device are outputting a differential output signal that differs from a differential output signal output by the first and second terminals of the co-operating communications device, and a second condition when the differential signals output by the devices are substantially the same.

4. An apparatus as claimed in claim 3, in which in the second condition there is substantially no current flow at the output or the magnitude of the current flow is below a first threshold.

5. An apparatus as claimed in claim 3, in which the non-zero condition assumed by the output is indicated when the current flow exceeds the first threshold.

6. An apparatus as claimed in claim 3, further including an output processor for monitoring the output and setting first and second digital outputs to values representing 0 and 1 so as to represent the sign and magnitude of the sum of the differential currents resulting from operation of the device and of the co-operating communications device.

7. An apparatus as claimed in claim 1, in which the apparatus is responsive to a differential current flowing at the communications terminals.

8. An apparatus as claimed in claim 7, in which the apparatus is not responsive to common mode current flow.

9. An apparatus as claimed in claim 7, further comprising a decoder for decoding the differential current flow into a single ended signal.

10. An apparatus as claimed in claim 9, in which the decoder outputs first and second signals representing decoded representations of the output signals of the communications apparatus and the co-operating communications apparatus.

11. An integrated circuit including an apparatus as claimed in claim 1.

12. A power supply controller for enabling a power supply to be connected to a load including an apparatus as claimed in claim 1.

13. A power supply selection system comprising two power supply controllers as claimed in claim 12 each for controlling a selection of a respective power supply and exchanging information with each other.

14. A power supply selection system as claimed in claim 12, wherein each controller uses knowledge about it's own operating state to resolve an ambiguity in the data exchanged between the controllers.

15. A system comprising first and second devices, each including an apparatus as claimed in claim 1, and in which each device uses knowledge of its own operating state to resolve information conveyed to it, where such information is ambiguous.

* * * * *